(12) United States Patent
Mies et al.

(10) Patent No.: US 8,309,214 B2
(45) Date of Patent: Nov. 13, 2012

(54) COMPOSITE COMPONENT FOR A VEHICLE BODY, IN PARTICULAR A VEHICLE ROOF, AND PRODUCTION METHOD FOR SAID COMPONENT

(75) Inventors: Detlef Mies, Elsdorf (DE); Frank Kiesewetter, Germering (DE); Dirk Wegener, Monheim a. Rhein (DE); Jan Wokoeck, Bad Aibling (DE)

(73) Assignees: Webasto AG, Stockdorf (DE); Bayer MaterialScience AG, Leverkusen (DE)

( * ) Notice: Subject to any disclaimer, the term of this patent is extended or adjusted under 35 U.S.C. 154(b) by 1470 days.

(21) Appl. No.: 11/568,161

(22) PCT Filed: Apr. 18, 2005

(86) PCT No.: PCT/DE2005/000705
§ 371 (c)(1),
(2), (4) Date: Sep. 4, 2007

(87) PCT Pub. No.: WO2005/102697
PCT Pub. Date: Nov. 3, 2005

(65) Prior Publication Data
US 2007/0290400 A1    Dec. 20, 2007

(30) Foreign Application Priority Data
Apr. 20, 2004  (DE) .................. 10 2004 019 051

(51) Int. Cl.
*B32B 5/12* (2006.01)
*B32B 27/04* (2006.01)
*B32B 25/02* (2006.01)
*B27N 3/10* (2006.01)

(52) U.S. Cl. ............... 428/300.1; 428/113; 428/297.1; 428/299.4; 264/257

(58) Field of Classification Search .................. None
See application file for complete search history.

(56) References Cited

U.S. PATENT DOCUMENTS

| 3,591,444 A * | 7/1971 | Hoppe ................ 428/86 |
| 6,378,208 B1 | 4/2002 | Kölbl et al. |
| 6,761,953 B2 | 7/2004 | Haas et al. |
| 6,860,548 B2 | 3/2005 | Bohm et al. |
| 6,869,133 B2 | 3/2005 | Böhm et al. |
| 7,017,981 B2 | 3/2006 | Strohmayr et al. |
| 2003/0110880 A1 * | 6/2003 | Tison et al. ............ 428/304.4 |
| 2003/0152748 A1 | 8/2003 | Schonebeck |

FOREIGN PATENT DOCUMENTS

| DE | 10202911 C1 | 7/2003 |
| EP | 0995667 A1 | 4/2000 |

* cited by examiner

*Primary Examiner* — Camie Thompson
(74) *Attorney, Agent, or Firm* — Roberts Mlotkowski Safran & Cole, P.C.; David S. Safran

(57) ABSTRACT

A composite member for a vehicle body a method for manufacturing such a composite member, in particular, for a vehicle roof, with a fiber-free outer skin (12) and a fiber-reinforced support layer (16), which is deposited at the inner side of the outer skin in order to support the outer skin. The side of the support layer (16) that faces away from the outer skin (12) is provided with a fiber-reinforced reinforcing layer (18) for reinforcing the support layer. The reinforcing layer has a higher fiber concentration than the support layer.

19 Claims, 1 Drawing Sheet

COMPOSITE COMPONENT FOR A VEHICLE BODY, IN PARTICULAR A VEHICLE ROOF, AND PRODUCTION METHOD FOR SAID COMPONENT

BACKGROUND OF THE INVENTION

1. Field of the Invention

The present invention relates to a composite member for a vehicle body, in particular, a vehicle roof, comprising a fiber-free outer skin and a fiber-reinforced support layer which is provided at the inner side of the outer skin for reinforcing the outer skin as well as to corresponding method for manufacturing.

2. Description of Related Art

A composite member according to the preamble is known, e.g., from German Patent DE 102 02 911 C1, where, in the region of the interface between the outer skin and the support layer, an interface layer is provided in the support layer in which the fiber concentration is increased in comparison to the region outside the interface layer of the support layer in order to provide a composite member with a higher temperature stability. The support layer is made of polyurethane which is reinforced by means of a long fiber injection, while the interface layer is made of polyurethane reinforced by means of long fiber injection or is established by inlaying an additional glass fiber mat.

Additional composite members which form a roof module for a vehicle and which are provided with a fiber reinforced support layer of polyurethane with a homogeneous distribution of fibers are known, e.g., from German Patent Application DE 102 05 295 A1 (which corresponds to U.S. Patent Application Publication 2003/0152748 A1), German Patent Application DE 102 07 295 A1, U.S. Pat. No. 6,378,208 B1 as well as European Patent Application EP 0 995 667 A1 and European Patent Application EP 1 384 655 A2 (which corresponds to U.S. Pat. No. 6,860,548 B2). In the latter two documents, the reinforcement of a polyurethane layer by means of inlaying of a tissue or woven and non-woven fabrics is mentioned as reinforcement.

A disadvantage of these composite members is that, for achieving a sufficient stability of the support layer, the needed fiber concentration leads to a non-uniform surface of the outer skin, especially after a thermal load.

SUMMARY OF THE INVENTION

It is the object of the present invention to provide a composite member for a vehicle body, in particular for a vehicle roof, wherein a good surface quality of the outer skin can be achieved as well as a sufficient stability of the support layer. In addition, a method for manufacturing such a composite member is to be provided.

This problem is solved according to the invention by a composite member and a method for manufacturing in which, for reinforcing the support layer, a fiber-reinforced reinforcing layer is provided at that side of the support layer facing away from the outer skin, wherein the reinforcing layer comprises a higher fiber concentration than the support layer. The composite member and a method of the invention have the advantage that the fiber-reinforced reinforcing layer provided with a higher fiber concentration than the support layer at the side of the support layer facing away from the outer skin, on the one hand, enables the fiber concentration of the support layer to be reduced to achieve a good surface quality of the outer skin even after a thermal load while, on the other hand, the reinforcing layer, nevertheless, provides a sufficient mechanical stability of the composite member.

In the following, the invention is explained on the basis of the figures in an exemplary way.

DETAILED DESCRIPTION OF THE INVENTION

Figure 1:
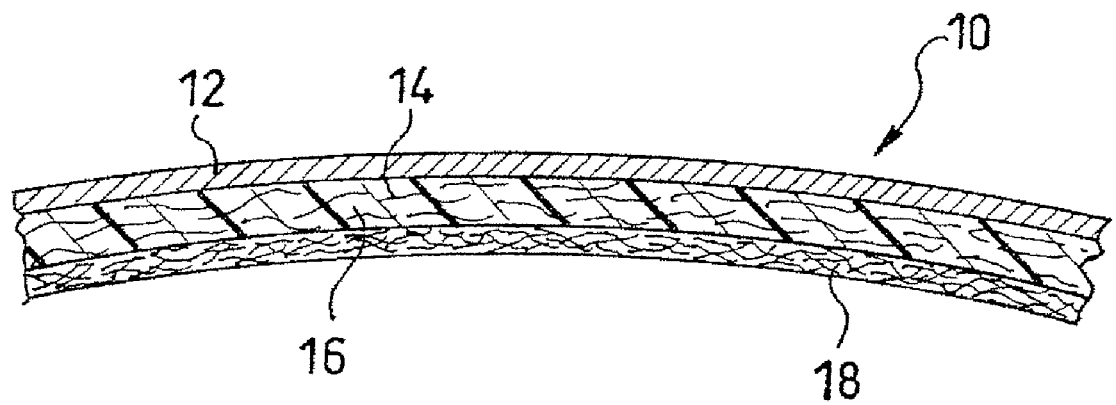
FIG. 1 is a cross section through a composite member according to a first embodiment.

In FIG. 1, a cross section through a composite member 10 for a vehicle body is shown, that comprises a fiber-free outer skin 12, a support layer 16 on the inner surface of the outer skin, wherein the support layer is reinforced with fibers 14, and a fiber-reinforced reinforcing layer 18 is provided on that surface of the support layer 16 facing away from the outer skin. The support layer 16 acts as reinforcement of the outer skin 12, while the reinforcing layer 18 acts as reinforcement of the support layer 16.

Preferably, the composite member 10 is a part of a vehicle roof, in particular, of a so-called roof module. In this case, the outer skin 12 forms the outer side of a fixed roof surface.

In principle, the reinforcing layer 18 has a higher fiber concentration than the support layer 16. In the case of the example of FIG. 1, this is achieved by providing the reinforcing layer 18 substantially as a glass fiber mat laid onto the supporting layer 16 during the manufacturing process.

The base material for the support layer 16 is preferably polyurethane, which is reinforced by means of a long fiber injection.

Preferably, the outer skin 12 is rear injected or rear lined with the support layer 16.

The outer skin 12 is, for example, a fiber-free plastic layer or a thin aluminum or steel sheet.

Preferably, the fibers 14 are homogeneously distributed within the support layer 16, where the fiber concentration within the support layer is preferably less than 10 weight percent.

The glass fiber mat of the reinforcing layer 18 has, preferably, a mass per unit area between 225 and 450 g/m$^2$, where the glass fiber mat is saturated with the polyurethane of support layer 16.

The fibers 14 are preferably glass fibers.

The manufacturing of the composite member 10 can, for example, be carried out by laying the outer skin 12 into a lower mold, fixing a glass fiber mat on the corresponding upper mold, depositing the support layer 16 by long fiber injection in polyurethane on the outer skin 12, closing upper and lower mold parts, hardening the composite member 10, and subsequently, removing it from the tool.

Figure 2:
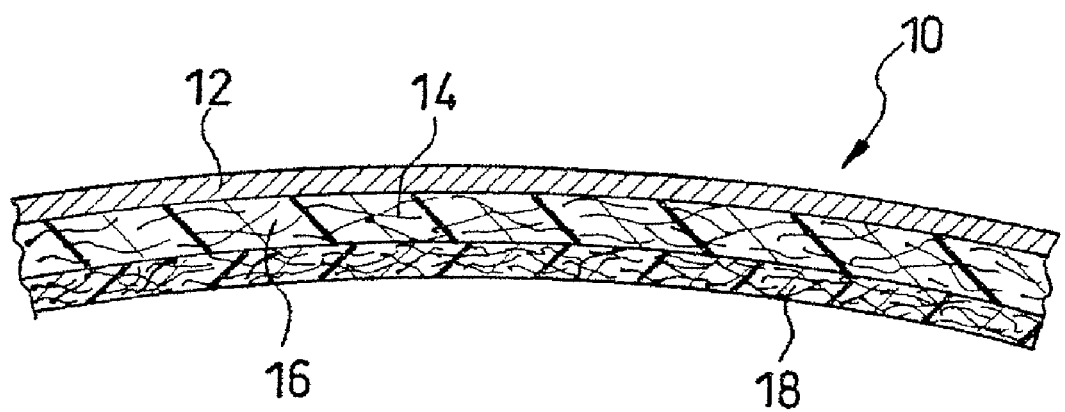
FIG. 2 is a cross section through a composite member according to a second embodiment.

In FIG. 2, a modified embodiment is shown, where the reinforcing layer 18 is not formed of an inlaid glass fiber mat, but is a layer of polyurethane reinforced by long fiber injection where, the fiber concentration having been adjusted to be higher than in the support layer 16. For example, the fiber concentration of the reinforcing layer 18 can be more than 30 weight percent, whereas the fibers 14 within the reinforcing layer 18 are preferably substantially homogeneously distributed.

In this case, support layer 16 and reinforcing layer 18 can, in principle, be produced in a single process step, in which the fiber concentration in the region of the layer deposited on the side of support layer 16 facing away from the outer skin is increased accordingly to form the reinforcing layer 18.

The invention claimed is:

1. Composite member for a vehicle body comprising a fiber-free outer skin (12) and a fiber-reinforced support layer (16), which is provided against an inner side of the outer skin for reinforcing the outer skin, characterized in that, for reinforcing the support layer (16), a fiber-reinforced reinforcing layer (18) is provided against a side of the support layer facing away from the outer skin (12), wherein the reinforcing layer comprises a higher fiber concentration than the support layer and wherein the fiber concentration within the support layer is substantially homogeneous.

2. Composite member according to claim 1, characterized in that the composite member (10) is part of a roof module.

3. Composite member according to claim 1, characterized in that the base material of the support layer (16) is polyurethane.

4. Composite member according to claim 3, characterized in that the support layer (16) is produced by long fiber injection.

5. Composite member according to claim 1, characterized in that the outer skin (12) is rear injected or rear lined with the support layer (16).

6. Composite member according to claim 1, characterized in that the outer skin is a plastic layer or a layer of aluminum or steel.

7. Composite member according to claim 1, characterized in that the fiber concentration of the support layer (16) is less than 10 weight percent.

8. Composite member according to claim 1, characterized in that the reinforcing layer (18) is formed by a glass fiber mat.

9. Composite member according to claim 8, characterized in that the glass fiber mat has a mass per unit area between 225 and 450 g/rn².

10. Composite member according to claim 8, characterized in that the glass fiber mat is saturated with polyurethane.

11. Composite member according to claim 1, characterized in that a base material of the reinforcing layer (18) is polyurethane.

12. Composite member according to claim 11, characterized in that the reinforcing layer (18) is produced by long fiber injection.

13. Composite member according to claim 1, characterized in that the fiber concentration within the reinforcing layer (18) is substantially homogeneous.

14. Composite member according to claim 1, characterized in that the fiber concentration of the reinforcing layer (18) is more than 30 weight percent.

15. Composite member according to claim 1, characterized in that the fibers of the fiber-reinforced support layer are glass fibers.

16. Method for manufacturing a composite member (10) for a vehicle body, wherein a fiber-free outer skin (12) is provided against an inner side with a fiber-reinforced support layer (16) for reinforcing the outer skin, characterized in that the support layer (16) is provided against a side facing away from the outer skin (12) with a fiber-reinforced reinforcing layer (18) for reinforcing the support layer (16), wherein the reinforcing layer comprises a higher fiber concentration than the support layer and wherein the fiber concentration within the support layer is substantially homogeneous.

17. Method according to claim 16, characterized in that the outer skin (12) is laid into a lower mould, a glass fiber mat is fixed at an upper mould, the support layer (16) is deposited at the outer skin, the upper mould and the lower mould are closed, the composite member is hardened and the composite member (10) is removed from the upper mould and the lower mould.

18. Method according to claim 17, characterized in that the support layer (16) is produced by long fiber injection in polyurethane.

19. Method according to claim 16, characterized in that the outer skin (12) is laid into a tool, the support layer (16) is deposited at the outer skin by long fiber injection into polyurethane, wherein, at the region facing away from the outer skin, a mixture with a higher fiber concentration is deposited, the tool is closed, the composite member (10) is hardened and the composite member is removed out of the tool.

* * * * *